（12） United States Patent
Jeon et al.

(10) Patent No.: US 8,879,031 B2
(45) Date of Patent: Nov. 4, 2014

(54) LIQUID CRYSTAL DISPLAY AND MANUFACTURING METHOD THEREOF

(71) Applicant: Samsung Display Co., Ltd., Yongin (KR)

(72) Inventors: Kyung-Sook Jeon, Yongin-si (KR); Jang-Soo Kim, Yongin-si (KR); Hong-Suk Yoo, Anyang-si (KR); Yong-Hwan Kim, Seongnam-si (KR); Hwa-Yeul Oh, Asan-si (KR); Jong-In Kim, Suwon-si (KR); Sang-Hee Jang, Bucheon-si (KR)

(73) Assignee: Samsung Display Co., Ltd., Yongin (KR)

( * ) Notice: Subject to any disclaimer, the term of this patent is extended or adjusted under 35 U.S.C. 154(b) by 7 days.

(21) Appl. No.: 14/046,396

(22) Filed: Oct. 4, 2013

(65) Prior Publication Data

US 2014/0036211 A1 Feb. 6, 2014

Related U.S. Application Data

(62) Division of application No. 12/611,492, filed on Nov. 3, 2009, now Pat. No. 8,564,748.

(30) Foreign Application Priority Data

Jun. 18, 2009 (KR) .................. 10-2009-0054561

(51) Int. Cl.
  *G02F 1/1333* (2006.01)
  *G02F 1/1339* (2006.01)
  *G02F 1/1335* (2006.01)

(52) U.S. Cl.
  CPC ...... *G02F 1/133514* (2013.01); *G02F 1/13394* (2013.01); *G02F 2001/133388* (2013.01); *G02F 1/133516* (2013.01)
  USPC ............ 349/122; 349/106; 349/110; 349/187

(58) Field of Classification Search
  CPC .......... G02F 1/13394; G02F 1/133514; G02F 1/133516; G02F 2001/133388

USPC ................ 349/106, 110, 122, 156, 160, 187; 345/88; 445/24, 25; 430/5, 321
  See application file for complete search history.

(56) References Cited

U.S. PATENT DOCUMENTS

2004/0238823 A1* 12/2004 Lee et al. ........................ 257/72
2005/0243261 A1 11/2005 Chiang et al.
(Continued)

FOREIGN PATENT DOCUMENTS

CN 1550827 12/2004
CN 101149545 3/2008
(Continued)

OTHER PUBLICATIONS

Non-Final Office Action issued on Feb. 1, 2013 in U.S. Appl. No. 12/611,492.

(Continued)

*Primary Examiner* — Dung Nguyen
*Assistant Examiner* — Tai Duong
(74) *Attorney, Agent, or Firm* — H.C. Park & Associates, PLC

(57) ABSTRACT

Exemplary embodiments of the present invention disclose a liquid crystal display (LCD) and a method of manufacturing the same. The LCD may have a display area and a peripheral area. An organic layer of the peripheral area may be patterned using a half-tone mask, and a protrusion member may be formed in the peripheral area. Accordingly, the thin film transistor array panel and the corresponding substrate may be prevented from being temporary adhered in the peripheral area such that the density of the liquid crystal molecules filled in the peripheral area may be uniformly maintained and the display quality of the liquid crystal display may be improved.

13 Claims, 8 Drawing Sheets

(56) References Cited

U.S. PATENT DOCUMENTS

| | | |
|---|---|---|
| 2006/0290838 A1 | 12/2006 | Ro et al. |
| 2007/0058125 A1 | 3/2007 | Yoo et al. |
| 2010/0033646 A1 | 2/2010 | Baek et al. |
| 2010/0065850 A1 | 3/2010 | Kwak et al. |
| 2010/0134731 A1 | 6/2010 | Jeon et al. |

FOREIGN PATENT DOCUMENTS

| | | |
|---|---|---|
| CN | 101344685 | 1/2009 |
| JP | 10-153797 | 6/1998 |
| JP | 2000-250066 | 9/2000 |
| JP | 2000-258784 | 9/2000 |
| JP | 2001-100652 | 4/2001 |
| JP | 2003-207788 | 7/2003 |
| JP | 2004-077703 | 3/2004 |
| JP | 2006-184671 | 7/2006 |
| JP | 2007-171560 | 7/2007 |
| JP | 2007-171715 | 7/2007 |
| JP | 2007-178662 | 7/2007 |

OTHER PUBLICATIONS

Notice of Allowance issued on Jun. 10, 2013 in U.S. Appl. No. 12/611,492.

Notice of Allowance issued on Aug. 13, 2013 in U.S. Appl. No. 12/611,492.

\* cited by examiner

LIQUID CRYSTAL DISPLAY AND MANUFACTURING METHOD THEREOF

CROSS REFERENCE TO RELATED APPLICATIONS

This application is a divisional of U.S. patent application Ser. No. 12/611,492, filed on Nov. 3, 2009, and claims priority from and the benefit of Korean Patent Application No. 10-2009-0054561, filed on Jun. 18, 2009, all of which are hereby incorporated by reference for all purposes as if fully set forth herein.

BACKGROUND OF THE INVENTION

1. Field of the Invention

Exemplary embodiments of the present invention relate to a liquid crystal display and manufacturing methods of the same.

2. Description of the Background

A liquid crystal display (LCD) is one of the most widely used flat panel displays (FPD), and may be composed of two display panels on which field generating electrodes, such as pixel electrodes and a common electrode, are formed. A liquid crystal layer may be interposed between the two display panels. In the LCD, voltages may be applied to the field generating electrodes to generate an electric field over the liquid crystal layer. Liquid crystal molecules of the liquid crystal layer may be aligned according to the electric field. The polarization of incident light may thereby be controlled to display images.

A LCD may include a display panel formed with a thin film transistor (TFT). The TFT array panel may be formed by patterning several layers such as electrodes and semiconductors. A mask may generally be used in the patterning process.

The LCD may be divided into a display area and a peripheral area. Liquid crystal molecules of the liquid crystal layer may fill the display area and the peripheral area. However, when a size of the liquid crystal display is relatively large, a filling deterioration of the liquid crystal molecules disposed on the peripheral area may lead to a deterioration of the filling density of the liquid crystal molecule of the display area. Accordingly, the display quality of the liquid crystal display may be deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide a liquid crystal display and manufacturing methods of the same.

Additional features of the invention will be set forth in the description which follows, and in part will be apparent from the description, or may be learned by practice of the invention.

Exemplary embodiments of the present invention disclose a liquid crystal display including a substrate, a protrusion member, and an organic layer. The substrate includes a display area and a peripheral area. The protrusion member is disposed in the peripheral area. The organic layer is disposed in the peripheral area. A height of a first region of the organic layer is higher than a height of a second region of the organic layer of the peripheral area by more than about 1.5 μm. The first region of the organic layer is a region where the organic layer overlaps the protrusion member. The second region of the organic layer being a region where the organic layer and the protrusion member pattern do not overlap each other.

Exemplary embodiments of the present invention also disclose a liquid crystal display including a substrate, a protrusion member, and an organic layer. The substrate includes a display area and a peripheral area. The protrusion member pattern is disposed in the peripheral area. The organic layer is disposed in the peripheral area. The organic layer includes a recess region. The recess region is a recess portion enclosing the protrusion member pattern.

Exemplary embodiments of the present invention also disclose a liquid crystal display including a substrate, a protrusion member, a partition pattern, and at least one color filter. The substrate includes a display area and a peripheral area. The protrusion member pattern is disposed in the peripheral area and has a column shape. The partition pattern is disposed in the display area. The partition pattern includes the same material as the protrusion member pattern. The partition pattern is disposed at the same layer as the protrusion member pattern. The at least one color filter is disposed in a region defined by the partition pattern.

Exemplary embodiments of the present invention also disclose a manufacturing method of a liquid crystal display. The method includes disposing a protrusion member pattern in the peripheral area on a substrate. The substrate includes a display area and a peripheral area. The method includes disposing an organic layer on the protrusion member pattern by using a mask having different light transmittance. The light transmittance varies according to positions in the mask. The mask includes a translucent region corresponding to a region of the organic layer not overlapping the protrusion member pattern.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
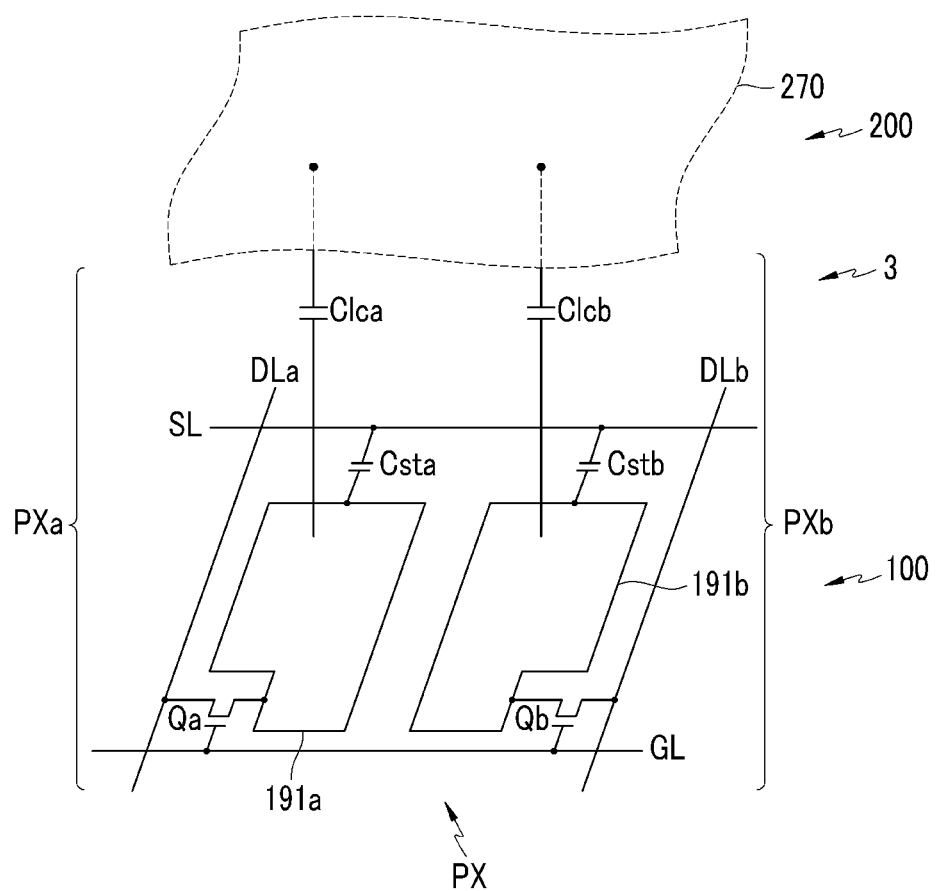
FIG. 1 is an equivalent circuit diagram of one pixel in a liquid crystal display according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", is "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used is herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention are described below in detail with reference to the drawings.

A liquid crystal display according to exemplary embodiments of the present invention will be described with reference to FIG. 1, FIG. 2, FIG. 3, and FIG. 4.

Figure 2:
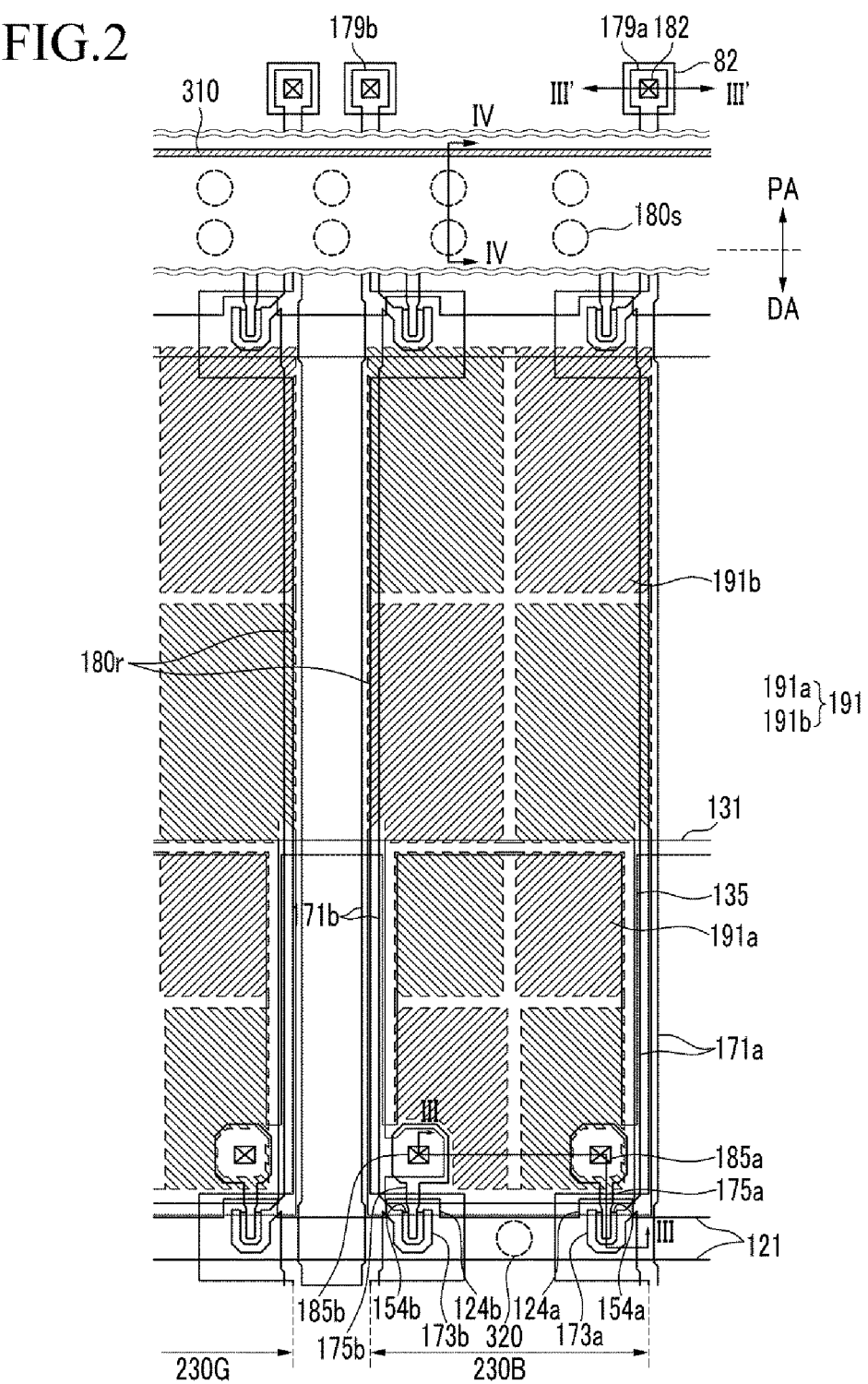
FIG. 2 is a layout view of a liquid crystal display according to exemplary embodiments of the present invention.
Figure 3:
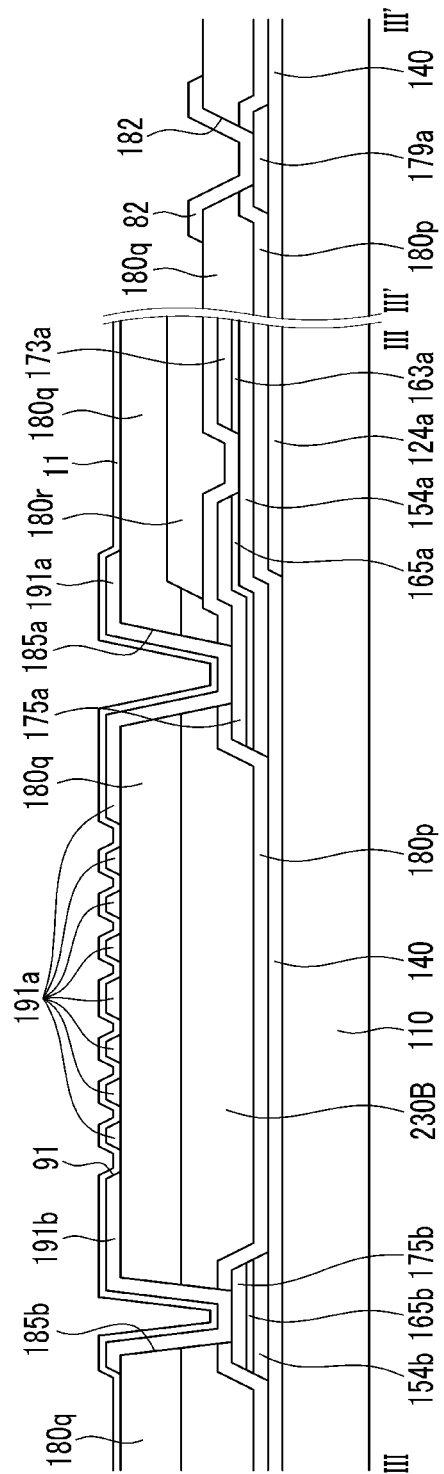
FIG. 3 is a cross-sectional view taken along the lines III-III and III'-III' of the liquid crystal display shown in FIG. 2 according to exemplary embodiments of the present invention.
Figure 4:
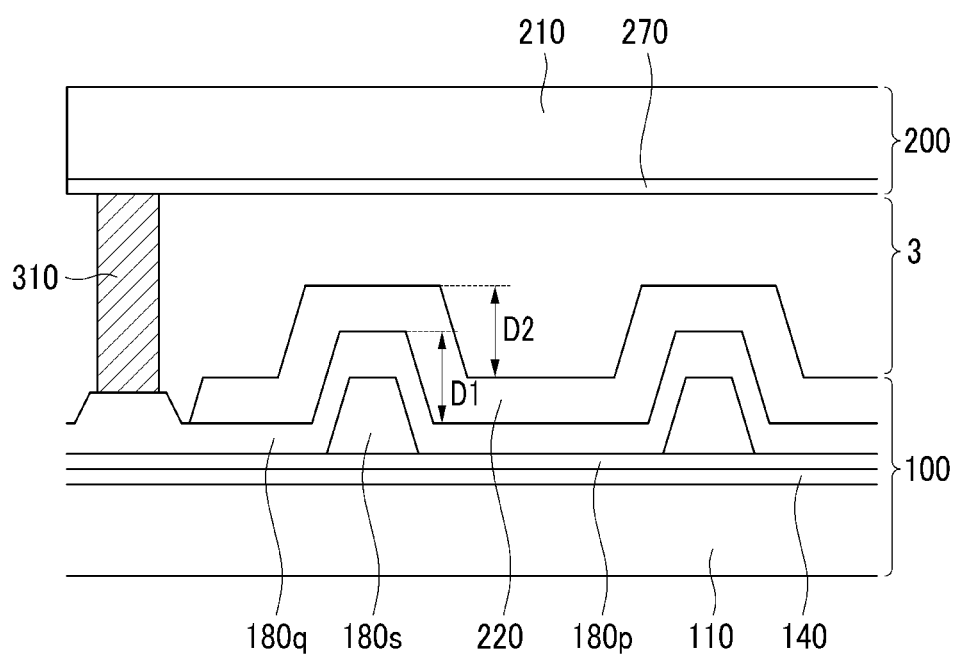
FIG. 4 is a cross-sectional view taken along the line IV-IV of the liquid crystal display shown in FIG. 2 according to exemplary embodiments of the present invention.

FIG. 1 is an equivalent circuit diagram of one pixel in a liquid crystal display according to exemplary embodiments of the present invention. FIG. 2 is a layout view of a liquid crystal display according to exemplary embodiments of the present invention. FIG. 3 is a cross-sectional view taken along the line III-III of the liquid crystal display shown in FIG. 2, according to exemplary embodiments of the present invention. FIG. 4 is a cross-sectional view taken along the line IV-IV of the liquid crystal display shown in FIG. 2, according to exemplary embodiments of the present invention.

Referring to FIG. 1, an LCD may include a thin film transistor (TFT) array panel 100, a corresponding panel 200, and a liquid crystal layer 3 interposed between the TFT array panel 100 and the corresponding panel 200. The TFT array panel 100 may include signal lines including a plurality of gate lines GL, a plurality of pairs of data lines DLa and DLb, and a plurality of storage electrode lines SL, and a plurality of pixels PX connected to the signal lines.

A pixel PX may include a pair of subpixels PXa and PXb. Subpixels PXa and PXb may include switching elements Qa and Qb, liquid crystal capacitors Clca and Clcb, and is storage capacitors Csta and Cstb, respectively.

A switching element Qa/Qb may be a three-terminal element, such as a TFT, provided on the lower panel 100, and may include a control terminal connected to the gate line GL, an input terminal connected to the data line DLa/DLb, and an output terminal connected to the liquid crystal capacitor Clca/Clcb and the storage capacitor Csta/Cstb.

The liquid crystal capacitor Clca/Clcb may have one terminal connected to a subpixel electrode 191a/191b and another terminal connected to a common electrode 270. The liquid crystal layer 3 disposed between the electrodes 191a/191b and common electrode 270 may be a dielectric material.

The storage capacitor Csta/Cstb may be coupled to the liquid crystal capacitor Clca/Clcb, the storage electrode line SL provided on the panel 100, and a subpixel electrode 191a/191b overlapped with an insulator interposed therebetween. A predetermined voltage, such as a common voltage Vcom, may be applied to the storage capacitor Csta/Cstb.

Referring to FIG. 1 and FIG. 2, a plurality of gate lines 121 and a plurality of storage electrode lines 131 and 135 may be formed on an insulating substrate 110. The insulating substrate 110 may include glass or plastic. The gate lines 121 may transmit gate signals and may extend substantially in the transverse direction. Each gate line 121 may include a plurality of first and second gate electrodes 124a and 124b protruding upward.

The storage electrode lines 131 and 135 include a stem 131 arranged substantially parallel to the gate lines 121, and a plurality of storage electrodes 135 extended from the stem 131. The storage electrode lines 131 and 135 may be provided in various forms, shapes, and arrangements. In some cases, the storage electrode line 131 and the storage electrode 135 may be omitted.

A gate insulating layer 140 may be formed on the gate lines 121 and the storage electrode lines 131 and 135. The gate insulating layer 140 may include silicon nitride (SiNx) and/or silicon oxide (SiOx).

A plurality of semiconductors 154a and 154b may be formed on the gate insulating layer 140, and may include hydrogenated amorphous silicon (amorphous silicon is referred to as a-Si) or polysilicon. It should be understood that the gate insulating layer 140 and the plurality of semiconductors 154a and 154b may include any suitable material, and are not limited to the materials noted above.

A plurality of pairs of ohmic contacts 161a and 161b, 163a and 163b, and 165a and 165b may be formed on the semiconductors 154a and 154b, and may include a material, such as, for example, metal silicide or n+ hydrogenated amorphous silicon in which an n-type impurity may be doped with a high concentration.

A plurality of data line pairs 171a and 171b, a plurality of first and second drain electrodes 175a and 175b, and end portions 179a and 179b of the data lines 171a and 171b may be formed on the ohmic contacts 161a, 161b, 163a, 163b, 165a, and 165b, and on the gate insulating layer 140.

The data lines 171a and 171b may transmit data signals, may extend substantially in the longitudinal direction, and may cross the gate lines 121 and the stems 131 of the storage electrode lines. A data line 171a/171b may include a plurality of first/second source electrodes 173a/173b extending toward the first/second gate electrodes 124a/124b, and may be curved in a "U" shape. The first/second source electrodes 173a/173b may be formed opposite to the first/second drain electrodes 175a/175b with respect to the first/second gate electrodes 124a/124b.

A first/second gate electrode 124a/124b, a first/second source electrode 173a/173b, a first/second drain electrode 175a/175b, and a first/second semiconductor 154a/154b may form a first/second TFT Qa/Qb, respectively. The channel of the TFT Qa/Qb may be formed in the first and the second semiconductors 154a and 154b between the first and second source electrodes 173a and 173b and the first and second drain electrodes 175a and 175b. The first and second drain electrodes 175a and 175b may be connected to pixel electrodes 191a and 191b of the LCD.

The ohmic contacts 163b and 165b may be interposed between the underlying semiconductor islands 154a and 154b, and the overlying data lines 171a and 171b and/or drain electrodes 175a and 175b.

Three layers, including the first and second semiconductors 154a and 154b except the channel portion, the ohmic contacts 161a, 161b, 163a, 163b, 165a, and 165b, and the data lines 171a and 171b including the first and second source electrodes 173a and 173b and the first and second drain electrodes 175a and 175b, may have substantially the same plane shape. The three layers may be formed using one mask. The first and second semiconductors 154a and 154b and the ohmic contacts 161a, 161b, 163a, 163b, 165a, 165b may have an island-type shape. It should be understood that the three layers and their components may be implemented in various shapes and sizes and are not limited to the description noted above.

An inorganic insulating layer 180p may include silicon nitride or silicon oxide and may be formed on the data lines 171a and 171b, the drain electrodes 175a and 175b, and the exposed semiconductors 154a and 154b. In some cases, the inorganic insulating layer 180p may not be included in the LCD.

A partition pattern 180r and a protrusion member pattern 180s may be formed at is the same layer on the inorganic insulating layer 180p, and may include the same material.

The partition pattern 180r may be disposed in the display area DA, extending in the column direction, and overlapping the data lines 171a and 171b. The partition pattern 180r may overlap the TFTs Qa and Qb. The partition pattern 180r may have contact holes 185a and 185b and may overlap the drain electrodes 175a and 175b. The partition pattern 180r may serve as a barrier separating a blue color filter 230B, a green color filter 230G, and a red color filter (not shown). That is, each of the color filters 230B and 230G may be formed using an Inkjet method in the region defined by the partition pattern 180r. The partition pattern 180r may have a thickness of about 3 μm, and a height higher than that of the color filters 230B and 230G.

The protrusion member pattern 180s may be disposed in the peripheral area PA, and may protrude in an approximate planar and column shape. It should be understood that the protrusion member pattern 180s may be formed in various shapes such as, for example, in approximately a circular, an octagonal, a quadrangular, a triangular, or a stripe shape. A plurality of protrusion member patterns 180s may be disposed at substantially uniform intervals to enclose the display area DA. Also, a plurality of protrusion member patterns 180s may be disposed to enclose a circumference of the display area DA with one or more folds. A thickness of the protrusion member pattern 180s may be substantially equal to the thickness of the partition pattern 180r. The partition pattern 180r and the protrusion member pattern 180s may be formed simultaneously using the same process, and in some cases, may be formed of the same material. The partition pattern 180r and the protrusion member pattern 180s may include a transparent organic material, a photosensitive material, and/or a material functioning as a light blocking member having optical density of more than about 4.0. In general, any suitable material(s) may be used to form the partition pattern 180r and the protrusion member pattern 180s.

A blue color filter 230B, a green color filter 230G, and a red color filter (not shown) may be formed on the inorganic insulating layer 180p. Each of the color filters 230B and 230G may be disposed between the partition patterns 180r and may have a band shape. The color filters 230B and 230G may be printed using an Inkjet process. In some cases, the color filters 230B and 230G may be formed on the corresponding panel 200 instead of the TFT array panel 100.

An organic layer 180q may be formed on the color filters 230B and 230G. The organic layer 180q may include silicon oxide, silicon nitride, and/or a photosensitive organic material. The organic layer 180q disposed in the display area DA may planarize the TFT array panel 100.

A portion (not in the protrusion member pattern 180s) in the organic layer 180q that is disposed in the peripheral area PA may be removed and formed to a predetermined thickness by using a half-tone mask 20. The half-tone mask may be a mask including regions with different light transmittance. For example, the half-tone mask may include a transmissive region transmitting all light, a light blocking region blocking all light, and a translucent region transmitting a portion of the light. The translucent region may include several closely disposed slits, or a thin metal layer to control an amount of light exposure.

A difference D1 between a first region of the organic layer 180q overlapping the protrusion member pattern 180s and a second region of the organic layer 180q that does not overlap the protrusion member pattern 180s may be more than about 1.5 μm. Accordingly, the first region of the organic layer 180q overlapping the protrusion member pattern 180s may function as a spacer of the peripheral area PA along with the protrusion member pattern 180s. Furthermore, when the difference D1 of the heights is more than about 2 μm, the first region of is the organic layer 180q overlapping the protrusion member pattern 180s may function as a better spacer in the peripheral area PA.

The organic layer 180q may be formed in the peripheral area PA without use of the half-tone mask. Although a partition is disposed under the organic layer 180q, a step of the organic layer 180q may be generated at less than about 0.6 μm of the partition due to the planarization effect of the organic layer 180q. Accordingly, it may be difficult for the organic layer 180q to function as a spacer.

A plurality of pixel electrodes 191 and connecting members 82 may be formed on the organic layer 180q. A connecting member 82 may contact an end portion 179a of the data line 171a through a contact hole 182. The pixel electrodes 191 and the connecting members 82 may include the same material such as, for example, ITO or IZO, and may be simultaneously formed using the same method.

Each pixel electrode 191 may include first and second subpixel electrodes 191a and 191b that are separated from each other with a gap 91.

The overall shape of the first and second subpixel electrodes 191a and 191b may be a quadrangle. An area occupied by the second subpixel electrode 191b may be relatively larger than an area occupied by the first subpixel electrode 191a in the whole pixel electrode 191.

A first/second subpixel electrode 191a/191b may be physically and electrically connected to the first/second drain electrode 175a/175b through the contact hole 185a/185b, and may receive data voltages from the first/second drain electrode 175a/175b.

A light blocking member 220 may be formed on the pixel electrode 191. The light blocking member 220 positioned in the display area DA may be arranged parallel to the data lines 171a and 171b in the column direction. The light blocking member 220 may include protrusions covering the first and second TFTs Qa and Qb. The light blocking member 220 may also cover regions between the color filters 230B and 230G thereby preventing light leakage. The light blocking member 220 positioned in the peripheral area PA may cover the peripheral area with an approximately uniform thickness. Further, in some cases, the light blocking member 220 may be formed in the corresponding panel 200 instead of the TFT array panel 100.

The height D2 of the light blocking member 220 near the protrusion member pattern 180s may be more than about 0.7 μm. That is, a height of a first region of the light blocking member 220 where the light blocking member 220 and the protrusion member pattern 180s overlap each other may be more than about 0.7 μm. A height of a second region of the light blocking member 220 where the light blocking member 220 and the protrusion member pattern 180s do not overlap each other (in the peripheral area) may be more than about 0.7 μm. Due to the height difference D2, the TFT array panel 100 and the corresponding panel 200 may be prevented from being temporarily adhered in the peripheral area PA. The density of the liquid crystal molecules filling the peripheral area PA may be uniformly maintained thereby improving the display quality of the LCD. Furthermore, the difference of height between the light blocking member 220 in the first region and the light blocking member 220 in the second region may be more than about 1 μm, thereby further improving the display quality of the liquid crystal display.

Without using the half-tone mask to form the organic layer 180q, the entire peripheral area may be planarized to less than about 0.6 μm. Accordingly, it can be difficult to prevent adhesion between the panels 100 and 200 in the peripheral area.

A spacer 320 may be formed, in some cases, on the pixel electrode 191 in the same layer as the light blocking member 220, and in some cases, in a different layer from the light blocking member 220. The spacer 320 may maintain a gap between the two panels 100 and 200 where the liquid crystal layer 3 is situated, and may be a column spacer. The column spacer 320 may be positioned between the first and second TFTs Qa and Qb.

The light blocking member 220 and the column spacer 320 may include the same material, and may be formed with different thicknesses by using the half-tone mask.

A lower alignment layer 11 may be formed on the pixel electrodes 191 and the connecting members 82.

A sealant 310 may seal and enclose the display area DA. The sealant 310 may be formed on the organic layer 180q in the peripheral area PA. The region corresponding to the organic layer 180q overlapping the sealant 310 may correspond to the translucent region of the mask. Accordingly, a thickness of the organic layer 180q overlapping the sealant 310 may be the same as a thickness of the organic layer 180q near the protrusion member pattern 180s.

In some cases, the region corresponding to the organic layer 180q overlapping the sealant 310 may correspond to the transmissive region or the light blocking region of the mask. In these cases, a thickness of the organic layer 180q overlapping the sealant 310 may be greater than a thickness of the organic layer 180q near the protrusion member pattern 180s.

Next, a manufacturing method of the LCD shown in FIG. 1 to FIG. 4 will be described with reference to FIG. 5 to FIG. 7. Descriptions of components already described with reference to FIG. 1 to FIG. 4 may be omitted.

Figure 5:
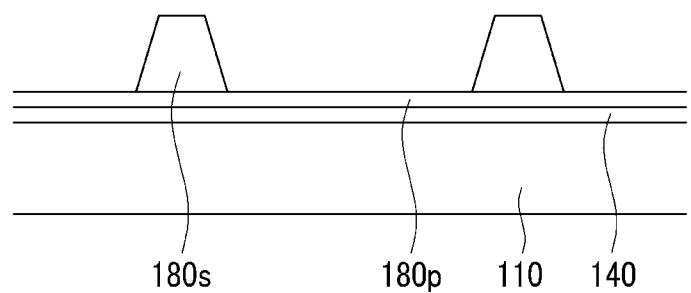
FIG. 5 and FIG. 6 are schematic diagrams showing a method to manufacture a liquid crystal display according to exemplary embodiments of the present invention.
Figure 6:
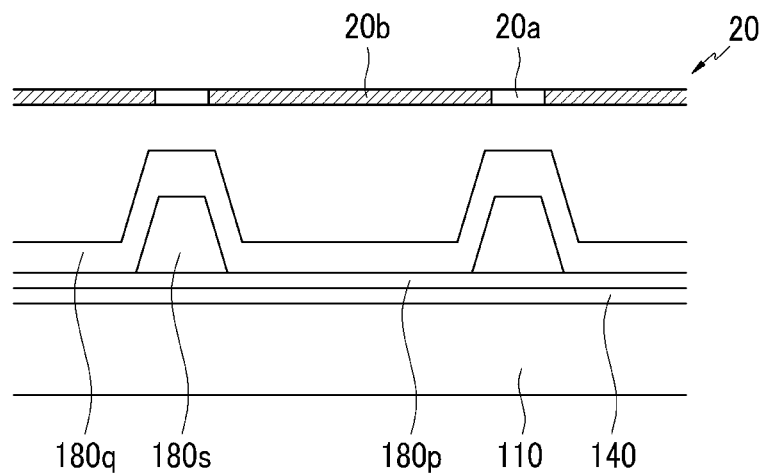

FIG. 5 and FIG. 6 are schematic diagrams showing a manufacturing process of a LCD. FIG. 7 is a top plan view of the mask used in FIG. 6.

A gate line 121 and storage electrode lines 131 and 135 may be formed on a substrate 110.

Next, a gate insulating layer 140 may be formed on the gate line 121 and the is storage electrode lines 131 and 135.

Three layers of semiconductors 154a and 154b, ohmic contacts 161a, 161b, 163b, 163b, 165a, and 165b, and data lines 171a and 171b and drain electrodes 175a and 175b (not shown) may be sequentially deposited and formed through a photolithography process on the gate insulating layer 140.

Next, an inorganic insulating layer 180p may be disposed on the three layers. The inorganic insulating layer 180p may include an opening. Contact holes 185a and 185b may be formed with an opening of the organic layer 180q. The opening of the inorganic insulating layer 180p may be the same size as an opening of the organic layer 180q. The opening of the organic layer 180q may be used as a mask to etch the inorganic insulating layer 180p and form the opening of the inorganic insulating layer 180p.

Referring to FIG. 2 and FIG. 5, a partition pattern 180r and a protrusion member pattern 180s may be formed simultaneously on the inorganic insulating layer 180p in the peripheral area PA.

Referring to FIG. 2 and FIG. 6, an organic layer 180q may be formed on the partition pattern 180r and the protrusion member pattern 180s. If the organic layer 180q includes a negative photosensitive organic material, a region of the organic layer 180q that does not overlap the protrusion member pattern 180s in the peripheral area PA may be formed to a uniform thickness by using the half-tone mask 20. That is, referring to FIG. 6 and FIG. 7, the half-tone mask 20 may include a transmissive region 20a transmitting all light, a translucent region 20b partially transmitting light, and a light blocking region (not shown) blocking all light. The translucent region 20b may be a slit pattern, a lattice pattern, or a thin film having intermediate transmittance or an intermediate thickness. The boundary between the transmissive is region 20a and the translucent region 20b may be formed within the circumference of the protrusion member pattern 180s.

As a result, if the mask 20 is properly aligned and the exposure and developing processes are executed, a thickness of the organic layer 180q corresponding to the translucent region 20b may be the height difference D1 as noted above. In some cases, the height difference D1 may be more than 1.5 μm. When the organic layer 180q includes a positive photosensitive organic material, the transmissive region 20a of the half-tone mask 20 may be used as a light blocking region.

Next, a pixel electrode 191 and a connecting member 82 may be formed on the organic layer 180q.

Next, a light blocking member 220 and a spacer 320 may be formed simultaneously on the pixel electrode 191 and the connecting member 82. The height difference D2 between the light blocking member 220 of the first region and the light blocking member 220 of the second region may be more than about 0.7 μm as noted above. In some cases, the height difference D2 may be more than 1.0 μm.

Next, a lower alignment layer 11 may be formed on the pixel electrode 191, the light blocking member 220, and the spacer 320. A liquid crystal layer 3 may then be disposed on the lower alignment layer 11.

On the corresponding substrate 210, a common electrode 270 may be formed. An upper alignment layer (not shown) may be formed on the common electrode 270.

The corresponding panel 200 may be aligned such that the common electrode 270 formed on the corresponding substrate 210 may contact the liquid crystal layer 3, and then the TFT array panel 100 and the corresponding panel 200 may be combined.

In some cases, when the liquid crystal layer 3 is formed on the common electrode 270 of the corresponding substrate 210, the corresponding panel 200 may be aligned such that the spacer 320 of the TFT array panel 100 contacts the liquid crystal layer 3, and then the TFT array panel 100 and the corresponding panel 200 may be combined.

Methods for forming the TFT and the electrode may include thin film deposition and patterning by photolithography.

Using the manufacturing method described above with reference to FIG. 5 to FIG. 7, the thickness of the protrusion member pattern 180s may be about 3.0 μm, the thickness of the organic layer 180q may be about 2.5 μm, and the thickness of the light blocking member 220 may be about 4.0 μm. Accordingly, the height difference D1 of the organic layer 180q may be about 2.12 μm, and the height difference D2 of the light blocking member 220 may be about 1.32 μm.

Hereinafter, another manufacturing method of an LCD will be described with reference to FIG. 8. Descriptions of processes and components already described with reference to FIG. 1 to FIG. 7 may be omitted.

Figure 8:
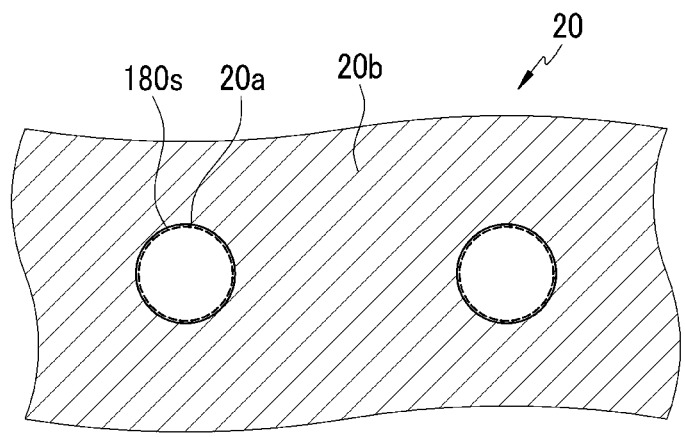
FIG. 8 is a top plan view of a mask used in a manufacturing process of a thin film transistor array panel according to exemplary embodiments of the present invention.

FIG. 8 is a top plan view of a mask used in a manufacturing process of a TFT array panel according to exemplary embodiments of the present invention.

Figure 7:
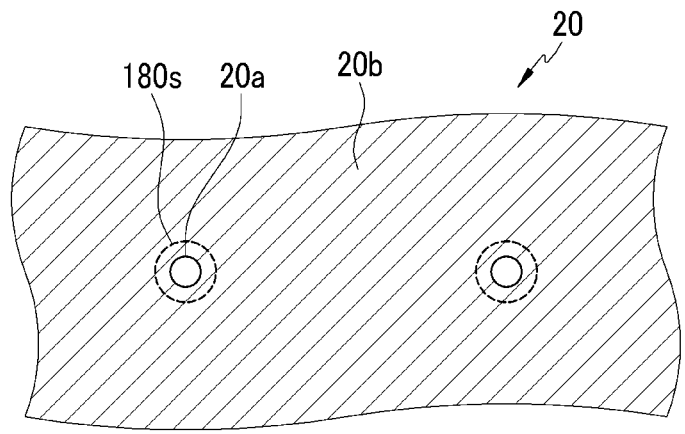
FIG. 7 is a top plan view of a mask used in FIG. 6 according to exemplary embodiments of the present invention.

The above-described description of FIG. 5, FIG. 6, and FIG. 7 may be similarly applied according to this method except that the boundary line of the transmissive region 20a and the translucent region 20b may be disposed outside the protrusion member pattern 180s circumference, or substantially along the circumference of the protrusion member pattern 180s.

Accordingly, by using the boundaries illustrated in FIG. 8, the thickness of the protrusion member pattern 180s may be about 3.0 μm, the thickness of the organic layer 180q is may be about 2.5 μm, and the thickness of the light blocking member 220 may be about 4.0 μm. Accordingly, the height difference D1 of the organic layer 180q may be about 2.07 μm, and the height difference D2 of the light blocking member 220 may be about 1.25 μm.

Next, another manufacturing method of an LCD according to exemplary embodiments of the present invention will be described with reference to FIG. 9 and FIG. 10. Descriptions of processes and components already described with reference to FIG. 1 to FIG. 7 may be omitted.

Figure 9:
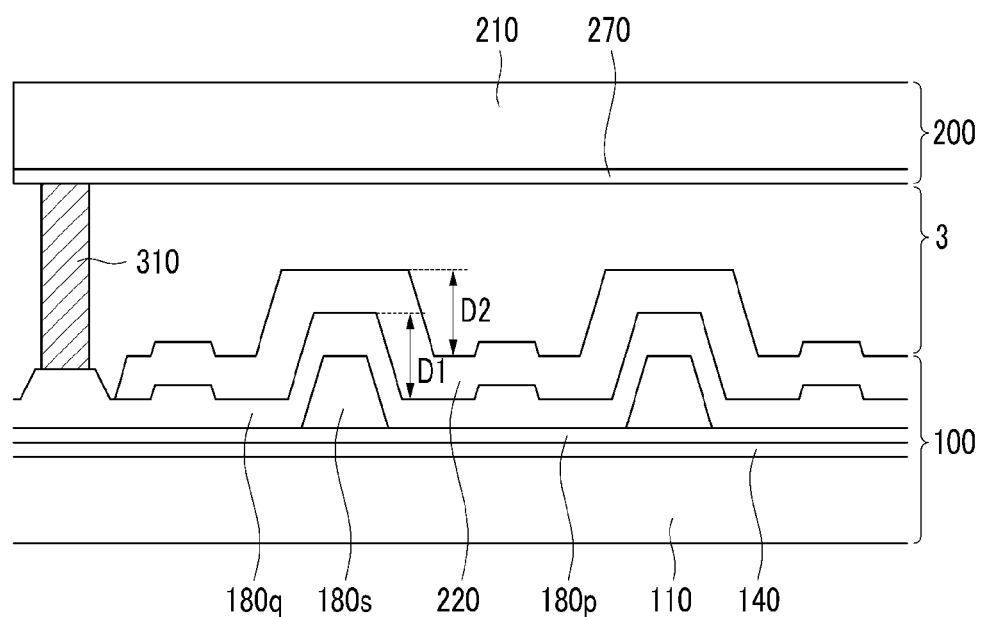
FIG. 9 is a cross-sectional view of a liquid crystal display according to exemplary embodiments of the present invention.
Figure 10:
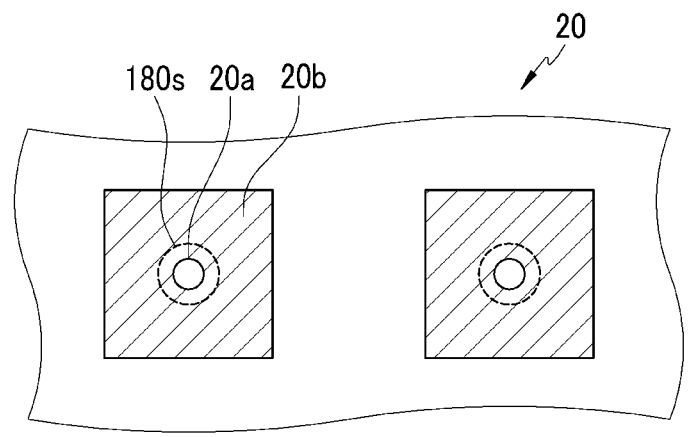
FIG. 10 is a top plan view of a mask used for a manufacturing process of the liquid crystal display shown in FIG. 9 according to exemplary embodiments of the present invention.

FIG. 9 is a cross-sectional view of an LCD according to exemplary embodiments of the present invention, and FIG. 10 is a top plan view of a mask used for a manufacturing process of the LCD shown in FIG. 9.

The description of the above-described LCD of FIG. 1 to FIG. 4, and the manufacturing method of the liquid crystal display of FIG. 5 to FIG. 7 may be similarly applied except that the translucent region 20b of the mask 20 may be positioned in the region less than 0.1 mm from a center of the protrusion member pattern 180s. The translucent region 20b may have a quadrangular shape enclosing the transmissive region 20a. It should be understood that the translucent region 20b and outer circumference thereof may have any suitable dimensions or shape, including, for example, circular, octagonal, triangular, or quadrangular. The inner boundary of the translucent region 20b may be positioned along the circumference of the protrusion member pattern 180s and the boundary of the transmissive region 20a.

When using a mask of FIG. 10 for forming the organic layer 180q, as shown in FIG. 9, a third region of the organic layer 180q may be formed according to the shape of the translucent region 20b and a shape of a recess portion on the circumference of the protrusion member pattern 180s. The height difference D1 between the first region of the organic layer is overlapping the protrusion member pattern 180s and the third region of the organic layer may be more than 1 μm.

A light blocking member 220 may be formed on the organic layer 180q. The height difference D2 between the portion of the light blocking member 220 overlapping the protrusion member pattern 180s and the portion of the light blocking member 220 overlapping the third region of the organic layer may be more than 0.7 μm. In some cases, the height difference D2 may be more than 1.0 μm. Accordingly, the display quality of the LCD may be further improved.

Figure 11:
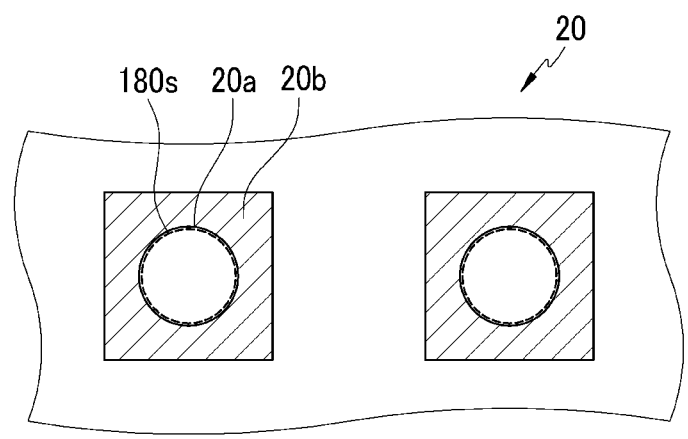
FIG. 11 is a top plan view of a mask used in a manufacturing process of a thin film transistor array panel according to exemplary embodiments of the present invention.

FIG. 11 is a top plan view of another mask used in a manufacturing process of a TFT array panel according to exemplary embodiments of the present invention.

The above-described description of FIG. 8 and FIG. 9 may be similarly applied except that the boundary inside the translucent region 20b may be disposed outside the circumference of the protrusion member pattern 180s, or along the circumference of the protrusion member pattern 180s.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a substrate comprising a display area and a peripheral area;
a protrusion member pattern disposed in the peripheral area; and
an organic layer disposed in the peripheral area,
wherein the organic layer comprises a recess region surrounding the sides of the protrusion member pattern.

2. The liquid crystal display of claim 1,
wherein a height of a first region of the organic layer is higher than a height of the recess region of the organic layer by more than about 1.0 μm, the first region being a region where the organic layer overlaps the protrusion member pattern, and
wherein the protrusion member pattern has a column shape.

3. The liquid crystal display of claim 2, further comprising:
a light blocking member disposed on the organic layer,
wherein a height of a first region of the light blocking member is higher than a height of a second region of the light blocking member by more than 0.7 μm, the first region of the light blocking member overlaps the protrusion member pattern, and the second region of the light blocking member overlaps the recess region of the organic layer.

4. The liquid crystal display of claim 3, wherein the height of the first region of the light blocking member is higher than the height of the second region of the light blocking member by more than 1.0 μm.

5. The liquid crystal display of claim 2, further comprising:
a sealant disposed on the organic layer,
wherein a height of a second region of the organic layer overlapping the sealant is higher than a height of the second region of the organic layer not overlapping the sealant.

6. The liquid crystal display of claim 1, further comprising:
a partition pattern disposed in the display area, the partition pattern comprising the same material as the protrusion member pattern, and the partition pattern formed at the same layer as the protrusion member pattern; and
at least one color filter disposed in a region defined by the partition pattern.

7. A method for manufacturing a liquid crystal display, the method comprising:
forming a protrusion member pattern in a peripheral area on a substrate, the substrate comprising a display area and the peripheral area; and
forming an organic layer on the protrusion member pattern using a mask having a light transmittance which varies according to positions in the mask,
wherein:
the mask comprises a translucent region; and
no portion of the translucent region faces a region of the organic layer overlapping a top surface of the protrusion member pattern.

8. The method of claim 7, wherein the mask comprises a transmissive region or a light blocking region, and the transmissive region or the light blocking region corresponds to the protrusion member pattern.

9. The method of claim 7, wherein the mask comprises a transmissive region or a light blocking region, and the transmissive region or the light blocking region corresponds to a portion of the protrusion member pattern.

10. The method of claim 7, further comprising:
forming, simultaneously, a partition pattern in the display area along with the protrusion member pattern, the partition pattern comprising the same material as the protrusion member pattern; and
forming a color filter in a region defined by the partition pattern.

11. The method of claim 7, further comprising:
forming a light blocking member on the organic layer,
wherein a height of a first region of the light blocking member is higher than a height of a second region of the light blocking member of the peripheral area by more than 1.0 μm, the first region of the light blocking member being a region where the light blocking member overlaps the protrusion member, and the second region of the light blocking member being a region where the light blocking member and the protrusion member pattern do not overlap each other.

12. The method of claim 7, further comprising:
disposing an inorganic insulating layer on the substrate, the inorganic insulating layer being arranged below the organic layer.

13. The method of claim 12, further comprising:
etching the inorganic insulating layer using the organic layer as a mask.

* * * * *